(12) United States Patent
Hagerott et al.

(10) Patent No.: US 10,486,792 B2
(45) Date of Patent: Nov. 26, 2019

(54) ACTUATOR HARDOVER MONITOR (71) Applicant: Textron Aviation Inc., Wichita, KS (US)

(72) Inventors: Steven G. Hagerott, Wichita, KS (US); Russell Peters, Colorado Springs, CO (US); Stephen M. Eddy, Derby, KS (US)

(73) Assignee: Textron Innovations, Inc., Providence, RI (US)

( * ) Notice: Subject to any disclaimer, the term of this patent is extended or adjusted under 35 U.S.C. 154(b) by 164 days.

(21) Appl. No.: 15/662,773

(22) Filed: Jul. 28, 2017

(65) Prior Publication Data

US 2018/0029690 A1 Feb. 1, 2018

Related U.S. Application Data

(60) Provisional application No. 62/369,325, filed on Aug. 1, 2016.

(51) Int. Cl.

| | |
|---|---|
| *B64C 9/00* | (2006.01) |
| *G05D 1/08* | (2006.01) |
| *B64C 5/10* | (2006.01) |
| *B64C 13/40* | (2006.01) |
| *B64D 45/00* | (2006.01) |
| *B64C 5/02* | (2006.01) |
| *B64C 9/14* | (2006.01) |

(52) U.S. Cl.
CPC .......... *B64C 9/00* (2013.01); *B64C 5/10* (2013.01); *B64C 13/40* (2013.01); *B64D 45/0005* (2013.01); *G05D 1/0808* (2013.01); *B64C 5/02* (2013.01); *B64C 9/14* (2013.01); *B64C 2009/005* (2013.01)

(58) Field of Classification Search
CPC .... B64C 9/00; B64C 9/14; B64C 5/10; B64C 5/02; B64C 2009/005; G05D 1/0808
See application file for complete search history.

(56) References Cited

U.S. PATENT DOCUMENTS

| | | | |
|---|---|---|---|
| 7,822,493 B2 | 10/2010 | Mossman et al. | |
| 8,190,309 B2 | 5/2012 | Boe et al. | |
| 2009/0314884 A1* | 12/2009 | Elliott | B64C 13/34 244/99.9 |

(Continued)

*Primary Examiner* — Aaron L Troost
(74) *Attorney, Agent, or Firm* — Erise IP, P.A.

(57) ABSTRACT

An actuator hardover monitor for a control surface includes an actuator sensor for detecting an actuator position, a command model of an expected position of the actuator based on an input command, and a monitor to determine whether a difference between the actuator position and the expected position exceeds a threshold for a predetermined duration. A method of preventing a hardover event for a control surface includes commanding an actuator valve to a commanded position, determining continuously when the commanded position, or an actuator valve position, or a control-surface position, or a modeled actuator valve position exceeds a predetermined limit to provide an exceedance. The method may further include filtering a signal of the exceedance based on a time constant to provide a filtered exceedance, and switching to a backup control-surface actuator when the filtered exceedance exceeds the predetermined limit for a predetermined duration.

26 Claims, 8 Drawing Sheets

(56) References Cited

U.S. PATENT DOCUMENTS

2013/0325254 A1\* 12/2013 Goupil .................... B64F 5/60
  701/33.9
2014/0297102 A1\* 10/2014 Moy ..................... B64C 13/50
  701/33.9
2016/0244152 A1\* 8/2016 Coffman ................ F16D 11/14

\* cited by examiner

ACTUATOR HARDOVER MONITOR

CROSS-REFERENCE TO RELATED APPLICATIONS

This application claims the benefit of U.S. Provisional Application No. 62/369,325, filed Aug. 1, 2016, which is incorporated herein by reference.

BACKGROUND

1. Field

Embodiments of this disclosure relate generally to control systems and methods, and more specifically to control systems and methods that anticipate and mitigate unintended deflection of control surfaces.

2. Description of the Related Art

U.S. Pat. No. 8,190,309 to Boe et al. discloses a system and method for detecting lateral dissymmetry of an aircraft and outputting a visual alarm if such a dissymmetry is detected. The dissymmetry is determined based on a control parameter representative of all roll control surfaces of the aircraft and a deflection angle of a lateral stick operated by a pilot to control the roll control surfaces. Specifically, the dissymmetry is determined by comparing a current value of the control parameter with a predetermined reference value and by comparing the current deflection angle of the lateral stick with a predetermined reference angle.

U.S. Pat. No. 7,822,493 to Mossman et al. discloses a system and method for monitoring and detecting failures in the actuation of a control system. The method includes defining a nominal model of the control system in terms of state variables, defining a model of an asymmetric actuation monitoring envelope that dynamically bounds a range that measured state variables of the system are allowed to take during operation of the system, monitoring a signal corresponding to a state variable of the system, and detecting a failure in the actuation of the control system when the monitored signal exceeds the bounds of the monitoring envelope.

SUMMARY

In an embodiment, an actuator hardover monitor for a control surface is provided. The actuator hardover monitor includes an actuator sensor for detecting an actuator position of a first control-surface actuator configured to control the control surface; and, a computer having a processor for executing software instructions stored in non-transitory memory. The software instructions include a command model of an expected position of the control-surface actuator based on an input command; and, a monitor to determine whether a difference between the actuator position and the expected position exceeds a threshold for a predetermined duration. The actuator hardover monitor further includes a switch for switching to a second control-surface actuator configured to control the control surface when the difference exceeds the threshold for at least the predetermined duration.

In another embodiment, a method of mitigating unintended deflection of a control surface include providing, from a sensor, a position signal indicative of a position of the control surface; providing a softstop limit corresponding to a deflection range of the control surface based on an aircraft parameter; determining when the position signal exceeds the softstop limit; monitoring the position signal for a first duration; and, switching from a primary control-surface actuator to a backup control-surface actuator for driving the control surface, when the position signal persists for at least the first duration.

In yet another embodiment, a method of anticipating and mitigating unintended deflections of for a control surface includes commanding an actuator valve to a commanded position, where the actuator valve is configured to control the control surface; determining continuously when the commanded position exceeds an actuator valve limit to provide an exceedance; and, switching to a backup control-surface actuator when the exceedance exceeds the actuator valve limit for a predetermined duration.

In still another embodiment, a method of correcting uncommanded motion of a control surface of an aircraft includes providing an actual position of the control surface from a position sensor; modeling an expected position of the control surface based on a control input; determining a difference between the actual position and the expected position; providing a limit for the control surface position based on an aircraft parameter; determining whether the difference exceeds the limit for a predetermined duration; and, switching to a backup control surface actuator when the difference exceeds the limit for at least the predetermined duration.

In yet another embodiment, a method of mitigating unintended deflection of a control surface includes providing a measured position of the control surface based on a control-surface sensor; providing an expected position of the control surface based on a position of an actuator valve from an actuator-valve sensor, where the actuator valve is configured to control the control surface; determining a difference between the measured position and the expected position; determining whether the difference exceeds a predetermined threshold for a predetermined duration; and, switching to a backup actuator valve when the difference is greater than the predetermined threshold for at least the predetermined duration.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

DETAILED DESCRIPTION

Unintended deflections of aircraft control surfaces include any uncommanded control-surface motion. Unintended deflections of control surfaces, sometimes known as hardover events, may lead to undesirable aircraft movement including potentially catastrophic loss of control of the aircraft. Unintended deflections may be caused by actuator malfunction, disconnection of control cables or actuators, or other system failures. In some hardover events, control surfaces may be jammed or immobilized in a fully deflected position and sometimes in a direction opposite to that commanded by the pilot presenting a dangerous situation. Safe aircraft operation requires systems and methods for counteracting hardover events to prevent loss of control and potential crash of the aircraft.

Figure 1:
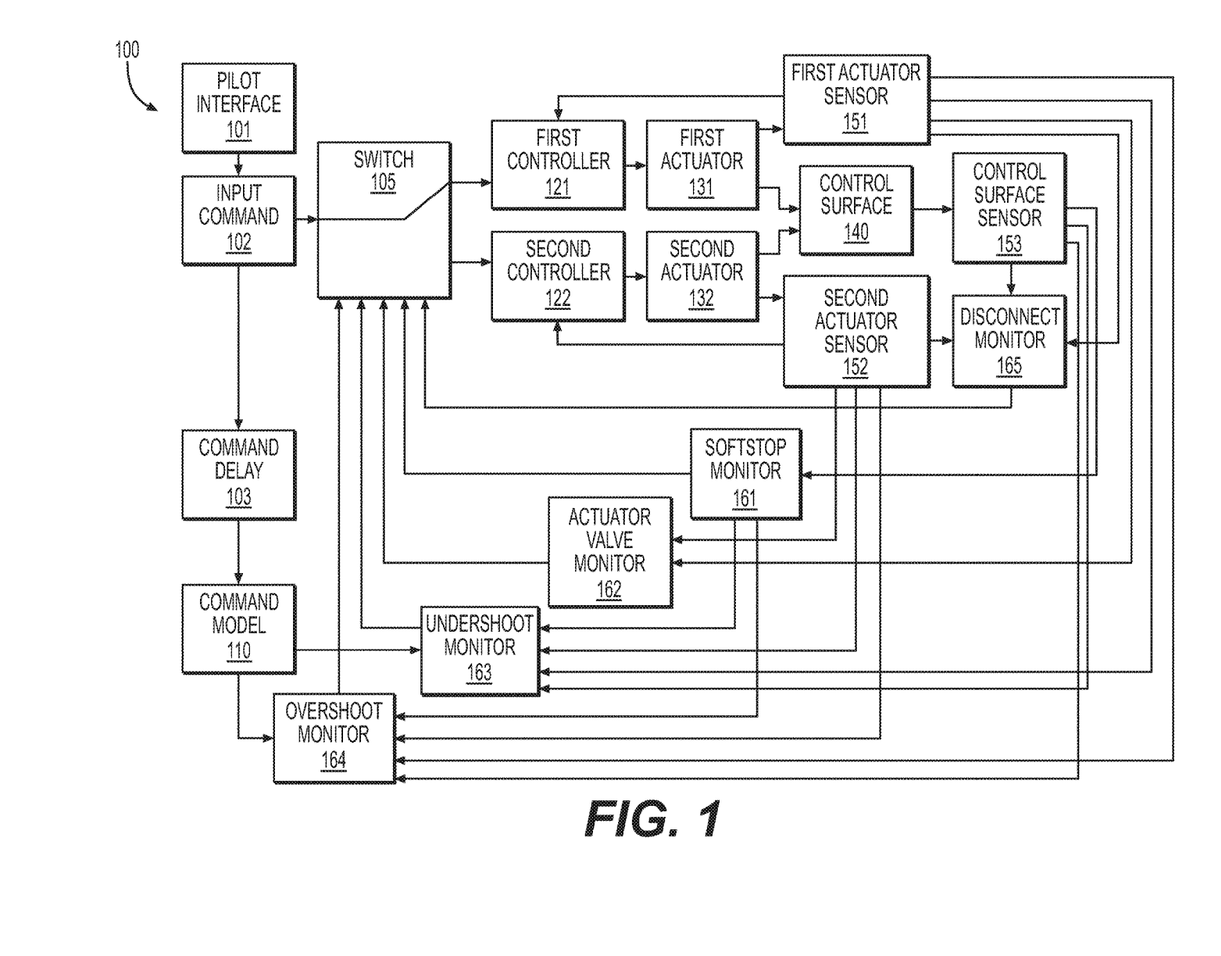
FIG. 1 is a block diagram of an actuator hardover monitoring system, in an embodiment.

FIG. 1 is a block diagram of an exemplary actuator hardover monitoring system 100. System 100 includes a pilot interface 101, which is for example a yoke, center stick, side stick, or touch-screen instrument panel. A pilot provides an input command 102 using pilot interface 101 for altering motion of the aircraft via one or more control surfaces, such as control surface 140. Control surface 140 is for example an aileron, elevator, horizontal stabilizer, flap, slat, spoiler, or rudder. A position of control surface 140 is detected using a control surface sensor 153. In an embodiment, control surface sensor 153 is a rotary-variable differential transformer (RVDT) configured to detect a hinge angle of control surface 140. Input command 102 electronically couples pilot interface 101 to either a first controller 121 or a second controller 122 via switch 105. First and second controller 121, 122 are configured to control a first actuator 131 and a second actuator 132, respectively. First and second actuator 131, 132 are in turn configured to move control surface 140, as described below.

First controller 121 and first actuator 131 are paired together and are redundant with second controller 122 and second actuator 132, which are likewise paired together. In the event of an unintended deflection of control surface 140, switch 105 enables changing the controller/actuator pair from for example first controller 121 and first actuator 131 to second controller 122 and second actuator 132 or vice versa. In this manner, a faulty actuator is avoided and the backup actuator takes over control of control surface 140, thus correcting the unintended deflection and mitigating potentially catastrophic loss of control of the aircraft. In an embodiment, switch 105 may change control of control surface 140 to a third controller/actuator pair or to a completely redundant control system.

In order for switching between controller/actuator pairs via switch 105 to effectively correct unintended deflections of control surface 140, rapid detection of the unintended deflection or hardover event is necessary. The required time to detect an unintended deflection depends on the rate at which first and second actuator 131, 132 operate, which may in turn depend on aircraft parameters, such as the aircraft's airspeed, due to aerodynamic forces on control surface 140.

Unintended deflections are detected using one or more monitors, such as a softstop monitor 161, an actuator valve monitor 162, an overshoot monitor 163, an undershoot monitor 164, and a disconnect monitor 165, which are described below. The monitors may operate in parallel to provide redundancy and to meet dissimilarity requirements.

Figure 2:
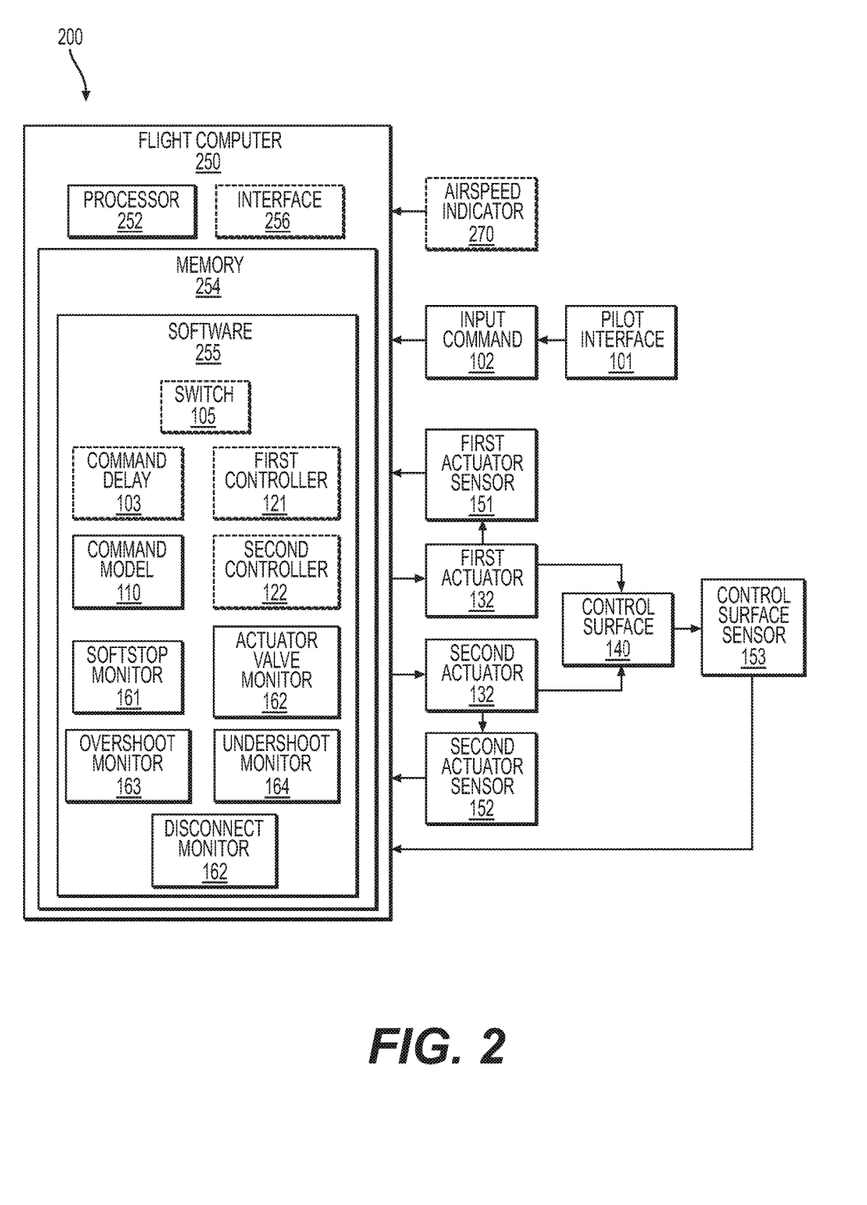
FIG. 2 is a block diagram of a communications architecture for performing functions of the system of FIG. 1, in an embodiment.

First and second controller 121, 122 include control algorithms executed by for example a flight computer onboard the aircraft, such as flight computer 250, FIG. 2. First and second controller 121, 122 may include a feedback mechanism having a weighted sum of one or more of a proportional term, an integral term, and a derivative term. The feedback mechanism depends on a difference or error term, $\varepsilon$, between input command 102 and an actuator response, either from first or second actuator 131, 132 depending on which actuator is activated as determined via switch 105. The response of first or second actuator 131, 132 is determined using one or more sensors for each actuator, such as a first actuator sensor 151 configured to determine a response of first actuator 131. Likewise, a second actuator sensor 152 is configured to determine a response of second actuator 131. Determining a response via first or second actuator sensor 151, 152 may include for example determining an instantaneous position or a rate of response of first or second actuator, respectively. In an embodiment, first and second actuator sensor 151, 152 include an instantaneous position sensor and a rate of response sensor.

First and second controller 121, 122 may include any type of suitable controller, including analog or digital, for controlling first and second actuator 131, 132, respectively. In an embodiment, first and second controller 121, 122 are proportional-integral-derivative controllers in which the proportional term adjusts input command 102 in proportion to the magnitude of $\varepsilon$, the integral term adjusts input command 102 in proportion to both the magnitude and the duration of $\varepsilon$ by integrating over time to account for any cumulative $\varepsilon$, and the derivative term adjusts input command 102 in proportion to the rate of change of $\varepsilon$ over time. The terms are weighted based on gains (e.g., coefficients), which may be tuned to provide a stable input command 102 with a minimal $\varepsilon$ to either first or second actuator 131, 132. In another embodiment, first and second controller 121, 122 are each a proportional-integral controller in which the derivative term is not used (e.g., set to zero). In certain embodiments, actuator valve position feedback may be used as a surrogate for rate feedback (e.g., derivative controller action).

First and second controller 121, 122 reduce $\varepsilon$ based on feedback from first and second actuator sensor 151, 152, respectively, which may be used to improve performance of control surface 140 in addition to avoiding unsafe deflection of control surface 140.

First and second actuator 131, 132 may include any type of suitable actuator for providing deflection of control surface 140, such as hydraulic, pneumatic, or electromechanical, for example. Depending on the type of control surface 140 to be actuated (e.g., aileron, elevator, horizontal stabilizer, flap, slat, spoiler, or rudder), different types of actuators may be preferentially employed. In an embodiment, first and second actuator 131, 132 include an electrohydraulic servo valve (EHSV) in which a servo valve electrically controls hydraulic fluid for transferring power to provide deflection of control surface 140. Position of the electrohydraulic servo valve may drive the rate at which first and second actuator 131, 132 move via a closed loop response based on $\varepsilon$. The closed loop response may approximate a first order lag.

First and second actuator 131, 132 may be operated at a predetermined rate, which may in turn depend on the aircraft's airspeed due to aerodynamic forces on control surface 140. For example, a rudder may operate within a range of 0.1 Hz to 10 Hz. While taxiing on the ground, the full rate range may be used, whereas during high speed flight the rate may be limited to a predetermined rate to avoid unsafe aerodynamic loads on control surface 140.

FIG. 2 is a block diagram of an exemplary communications architecture 200. Architecture 200 includes a flight computer 250, which is for example a computer onboard the aircraft having a memory 254, including a non-transitory medium for storing software 255, and a processor 252 for executing instructions of software 255. Flight computer 250 may further include an optional interface 256 for a pilot or co-pilot to transmit instructions and receive information. Flight computer 250 may receive avionics data of aircraft parameters. Example aircraft parameters include airspeed, estimated airspeed, stabilizer trim position, and flap position. Airspeed data is provided by an airspeed indicator 270. An example of airspeed indicator 270 is one or more pitot tubes. Communication between air data computer 250 and subsystems, shown in FIG. 2 and described below, may be by one of a wired and/or wireless communication media.

Some elements of FIG. 1 are reproduced in FIG. 2 with like reference numerals. Accordingly, their description is not repeated here. FIG. 2 shows software 255 including command delay 103, command model 110, softstop monitor 161, actuator valve monitor 162, overshoot monitor 163, undershoot monitor 164, and disconnect monitor 165. Monitors 161-165 provide instructions via software 255 stored in memory 254 and executable by processor 252.

FIG. 2 illustrates switch 105, first controller 121, and second controller 122 with dashed lines to indicate that these components are optionally included in software 255. Alternatively, switch 105 and first and second controller 121, 122 are located in communication with, but separate from, flight computer 250. Switch 105 may be an electrical switch and first and second controller 121, 122 may include a microcontroller, microprocessor, or programmable logic controller (PLC), which may be incorporated within an integrated circuit or printed circuit board, for example.

Command delay 103 provides instructions for delaying input command 102 by a time lag. The time lag is a configurable amount of time used to synchronize command model 110 with deflection of control surface 140. In an embodiment, command delay 103 is an integer number corresponding to computational cycles of command model 110. The integer number is tunable and may depend such aircraft parameters as aircraft airspeed.

In an embodiment, architecture 200 includes two separate flight computers, one for each controller/actuator pair, to provide further redundancy. For example, architecture 200 may have a first flight computer in communication with first controller 121 and first actuator 131 and a second flight computer in communication with second controller 122 and second actuator 132. In yet another embodiment, architecture 300 includes three controller/actuator pairs to provide further redundancy.

Figure 3:
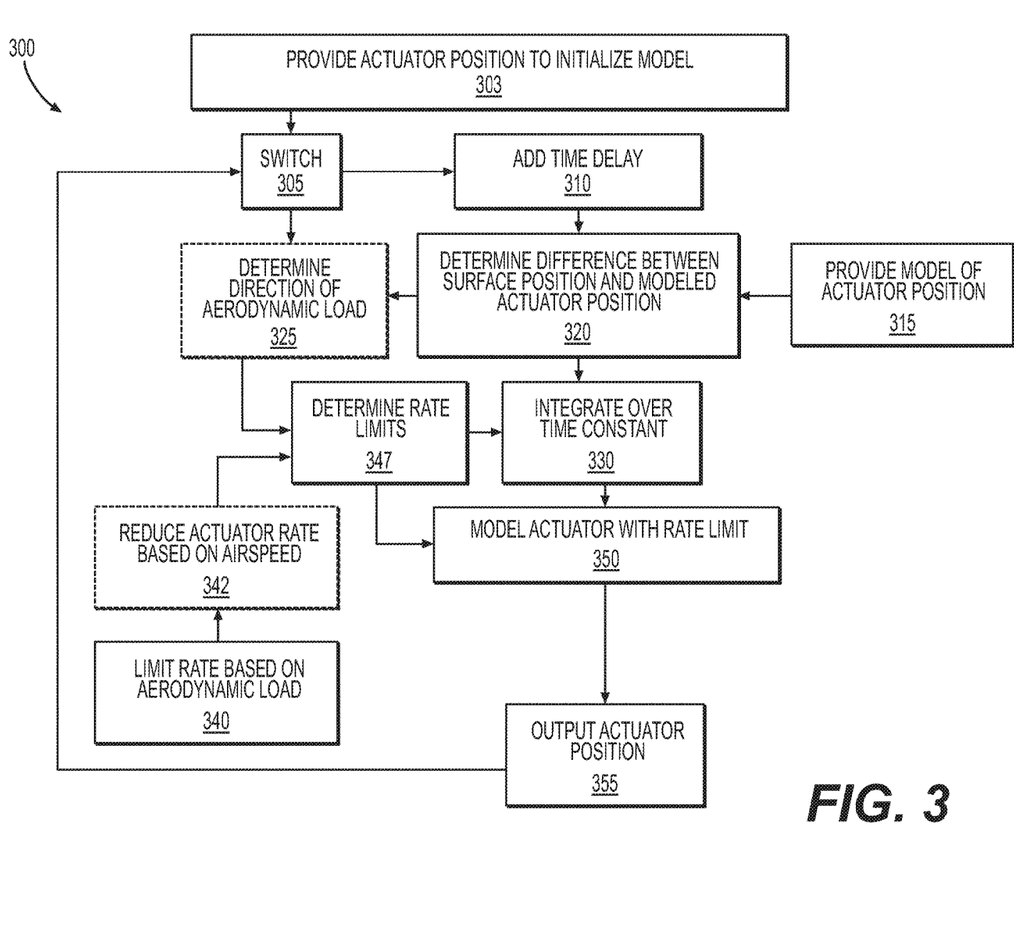
FIG. 3 shows steps of a command method performed using a command model of FIG. 1, in an embodiment.

FIG. 3 shows exemplary steps of a command method 300 performed using for example flight computer 250 executing command model 110, FIG. 2. Command method 300 is used for controlling control surface 140 by comparing an actuator position with a model of actuator position and adjusting the actuator position to minimize any difference therebetween.

In a step 303, an actuator position is provided to initialize the command model. In an example of step 303, a position of first actuator 131, FIG. 1 is provided via first actuator sensor 151 to initialize command model 110. The position of first actuator 131 is initialized in command model 110 in order to prevent a false trip of a monitor (e.g., monitors 161-165, FIG. 1).

In a step 305, a switch is provided. In an example of step 305, the position of control surface 140 switches from the measured position provided in step 303 to an actuator position output in step 355 after a first cycle of command method 300. In an embodiment, the position of first actuator 131 is in the form of a real-time position signal.

In a step 310, a time delay is added to the position signal. In an example of step 310 a time delay of between 1 and 10 cycles of command method 300 are added to the position signal. The time delay synchronizes the position signal with a modeled actuator position provided in step 315.

In a step 315, a model of actuator position is provided. In an example of step 315, an actuator position is determined from a physics-based computational model of the actuator.

In a step 320, a difference is determined between the modeled actuator position provided in step 315 and the time-delayed actuator position provided via step 310.

In an optional step 325, a direction of aerodynamic loading is determined. In an example of step 325, the direction of aerodynamic loading on control surface 140, FIG. 1 is determined with respect to the direction of motion of control surface 140. In other words, step 325 determines whether control surface 140 is moving with or against the aerodynamic load exerted on control surface 140. Step 325 may compare control surface 140 to a predetermined neutral or zero aerodynamic hinge moment for example.

In certain embodiments, such as when control surface 140 is a spoiler, the zero-hinge moment position (e.g., the float angle) is flap dependent. When the flaps are up, the zero-hinge moment for the spoilers may be about eight degrees, which is significant considering that a maximum travel is typically about thirty-five degrees. Thus, determining the direction of aerodynamic loading in step 325 takes into account the respective zero-hinge moment position for different types of control surfaces.

In a step 330, the difference determined in step 320 is integrated over a time constant. In an example of step 330, the time constant is the time it takes to process one cycle of command method 300 via flight computer 250. The integration may be limited between lower and upper actuator rates, as described below.

In a step 340, the actuator rate is limited based on an aerodynamic load. In an example of step 340, the rate of first actuator 131 is limited based on the aerodynamic load on control surface 140, which is a function of airspeed (e.g., from airspeed indicator 270) and the position of control surface 140. In an embodiment, the rate of first actuator 131 is limited by a fraction of a maximum rate of first actuator in proportion the position of control surface 140.

In an optional step 342, the actuator rate is further reduced based on an aircraft parameter. In an example of step 342, the rate of first actuator 131 is further reduced based on airspeed data provided by airspeed indicator 270. In an embodiment, the rate of first actuator 131 is limited by a fraction of the rate from step 340 in proportion to airspeed. Alternatively, the actuator rate may be further reduced based on other aircraft parameters, including but not limited to estimated airspeed, stabilizer trim position, or flap position.

In a step 347, the upper and lower rate limits are determined. In an example of step 347, the upper and lower rate limits for first actuator 131 are determined based on step 340 and optionally on steps 325 and 342.

In a step 350, the actuator is modeled with a rate limit. In an example of step 350, first actuator 131 is modeled with the rate limits determined in step 347. In an embodiment, step 350 uses a simplified actuator model compared to the physics-based model used in step 315.

In a step 355, an actuator position signal is output. In an example of step 355, the position of first actuator 131 is output and provided to switch 305 for subsequent cycles of command method 300.

Command method 300 provides an exemplary method for providing normal control over control surface 140. Monitors 161-165 are used to detect unintended deflections or hardover events of control surface 140 as detailed below in connection with FIGS. 4-8.

Figure 4:
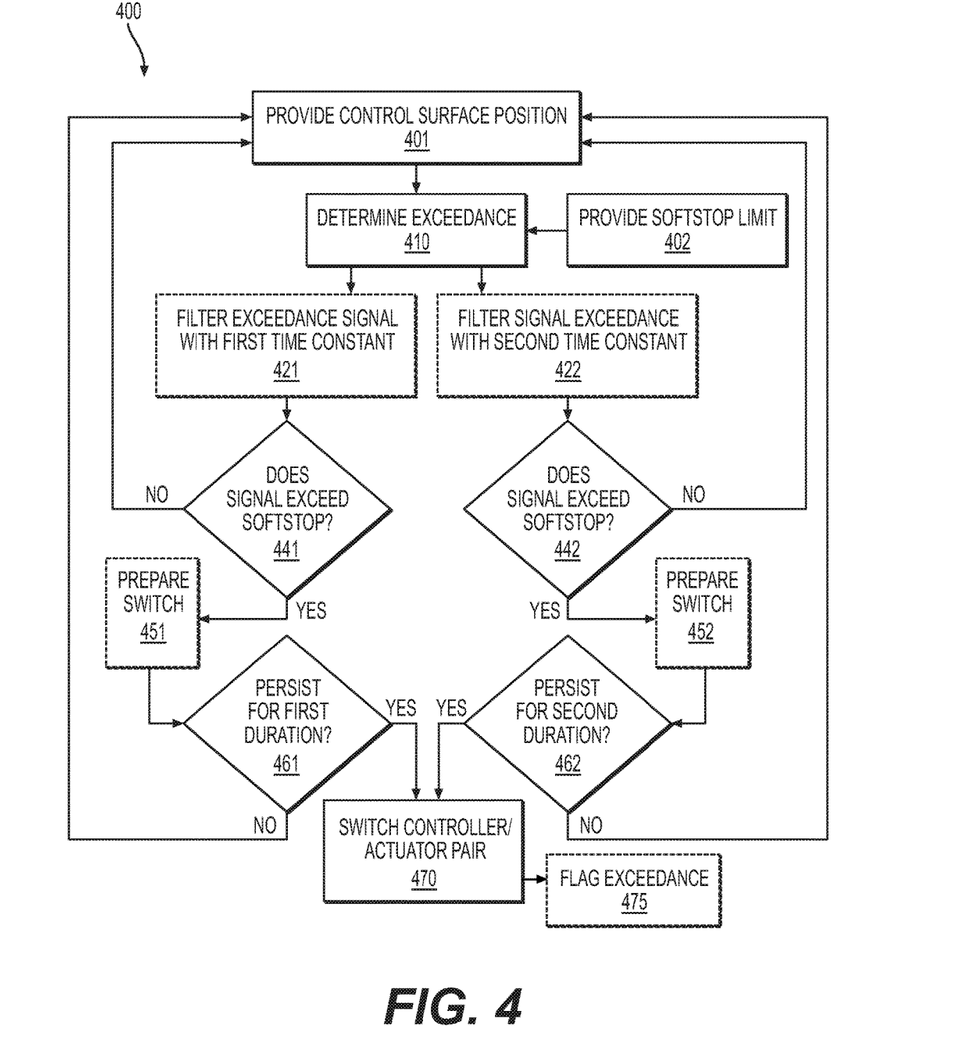
FIG. 4 shows steps of a softstop monitoring method performed using softstop monitor instructions of FIGS. 1 and 2, in an embodiment.

FIG. 4 shows exemplary steps of a softstop monitoring method 400 performed using for example flight computer 250, FIG. 2, executing instructions of softstop monitor 161. In an embodiment, method 400 monitors position of control surface 140 and compares the position with a softstop limit selected to prevent control surface 140 from reaching an unsafe position outside of its intended operating range. The softstop limit is for example predetermined to be a position that is less than the physical capability of control surface 140. Alternatively, method 400 may be used to determine a rate of control surface position change instead of control surface position without departing from the scope hereof.

In an embodiment, control surface sensor 153, FIG. 1 provides a position signal that may include signal noise such that a brief exceedance of the softstop limit due to signal noise would cause unacceptably frequent false positive trips of softstop monitor 161. Accordingly, one or more signal filters may be employed to remove signal noise and one or more checks may be performed to determine if a softstop exceedance persists for an extended duration, the length of which may be adjusted in connection with the extent of exceedance, as described below.

In a step 401, a control surface position is provided. In an example of step 401, position of control surface 140 is provided via control surface sensor 153, FIG. 1.

In a step 402, a softstop limit for position of the control surface is provided. In an example of step 402, a predetermined limit or range is provided for position of control surface 140. The softstop limit is for example some fraction of the full operating range of the control surface.

In a step 410, an exceedance is determined between the control surface position provided in step 401 and the softstop limit provided in step 402. In an example of step 410, the position of control surface 140 exceeds the softstop limit by an amount known as the exceedance. The exceedance is optionally provided to steps 421 and 422, which each initiate a series of checks performed in parallel and described below to avoid false positive trips of softstop monitor 161.

In an optional step 421, the exceedance is filtered with a first time constant. In an example of step 421, the position exceedance of control surface 140 over the softstop is filtered to remove transient spikes in the signal based on a predetermined time constant. In other words, position signal spikes that exceed the softstop for a duration that is shorter than the first time constant are removed to provide a first filtered exceedance signal.

A step 441 is a decision. If in step 441 the exceedance exceeds a first softstop, method 400 proceeds to step 451. Otherwise, method 400 returns to step 401 to initiate a next cycle of method 400.

In an optional step 451, a controller/actuator switch is prepared. In an example of step 451, switch 105, FIG. 1 is prepared for switching from a first controller/actuator pair (e.g., first controller 121 and first actuator 131) to a second controller/actuator pair (e.g., second controller 122 and second actuator 132). The preparation provides a delay prior to switching to enable second controller/actuator pair adequate time to establish control over control surface 140 and ensure a smooth transition between controller/actuator pairs.

A step 461 is another decision. If in step 461 the exceedance persists for a first duration, method 400 proceeds to step 470. The first duration is for example a predetermined period of time for monitoring the exceedance. In this manner, step 461 serves as a confirmation that the first softstop was exceeded by a first predetermined amount for the first duration. Otherwise, method 400 returns to step 401 for beginning a next cycle of method 400.

In a step 470, the controller/actuator pair is switched. In an example of step 470, switch 105 switches control of control surface 140 from first controller 121 and first actuator 131 to second controller 122 and second actuator 132.

In an optional step 475, the exceedance is flagged. In an example of step 475, a flag is set in software 255 and may be reported, via interface 256 for example, that a known faulty condition exists.

Returning to optional step 422, the exceedance is filtered with a second time constant. Step 422 is an example of step 421 using a second time constant instead of a first time constant. In this way, step 422 serves as a second filter to remove signal noise from step 410 to provide a second filtered exceedance signal.

A step 442 is a decision. If in step 442 the exceedance exceeds a second softstop, method 400 proceeds to step 461. Otherwise, method 400 returns to step 401 for beginning a next cycle of method 400. Step 442 is an example of step 441. First and second softstops may be equivalent or different without departing from the scope hereof.

In an optional step 452, a controller/actuator switch is prepared. Step 452 is an example of step 451 for preparing switch 105, FIG. 1 to ensure a smooth transition for switching from a first controller/actuator pair to a second controller/actuator pair.

A step 462 is another decision. If in step 462 the exceedance persists for a second duration, method 400 proceeds to step 470. The second duration is for example a predetermined period of time for monitoring the exceedance that is different from the first duration. Step 462 checks that the second softstop was exceeded by a second predetermined amount for the second duration. Otherwise, method 400 returns to step 401 for beginning a next cycle of method 400. The first and second predetermined amounts of exceedance and first and second durations may be variable and depend on airspeed and/or aerodynamic load on control surface 140, for example.

Steps 461 and 462 may be used in parallel to confirm that a softstop is exceeded by different amounts and for different durations. For example, step 461 may determine if a large exceedance persists for a short duration, whereas step 462 may determine if a smaller exceedance persists for a longer duration. In this manner, small exceedances of short duration do not trip a faulty condition, but large exceedances of short duration or smaller exceedances of longer duration lead to switching the controller/actuator pair in step 470. Of course, method 400 may be implemented using more than two time constants for determining whether a softstop is exceeded for more than two durations, without departing from the scope hereof.

Figure 5:
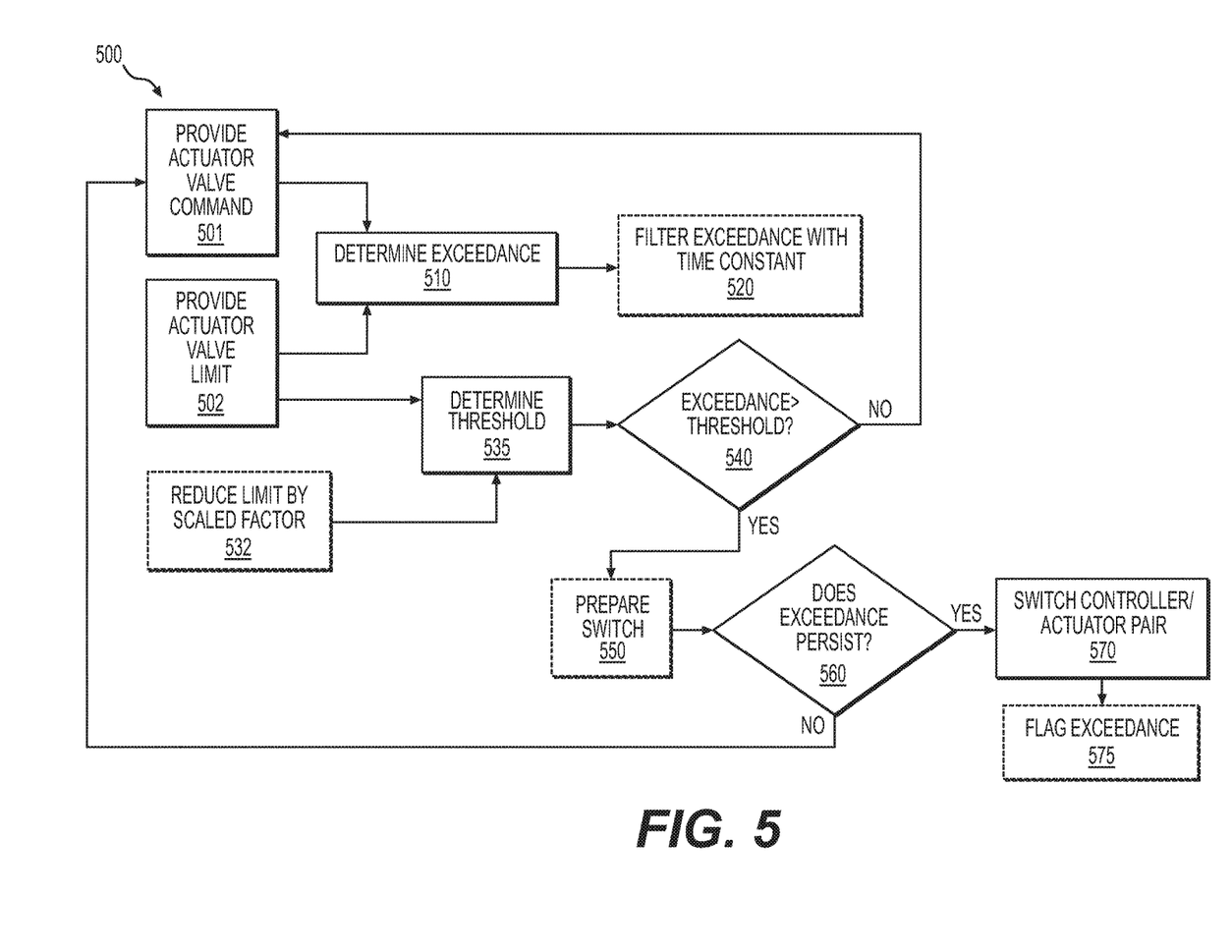
FIG. 5 shows steps of an actuator valve monitoring method performed using the actuator valve monitor instructions of FIGS. 1 and 2, in an embodiment.

FIG. 5 shows exemplary steps of a valve monitoring method 500 performed using for example flight computer 250, FIG. 2, executing instructions of actuator valve monitor 162. Actuator valve position provides a powerful leading indicator of action by a control surface. Method 500 monitors one or more positions of an actuator valve to determine if a predetermined limit has been exceeded for a predetermined duration.

In an embodiment, method 500 monitors position of an actuator valve to determine if the position exceeds a predetermined limit to prevent a hardover event of the control surface to an unsafe position outside of its intended operating range. The actuator valve limit is for example a position that is less than the expected operating range of the actuator valve. Alternatively, method 500 may be used to determine an actuator rate instead of position without departing from the scope hereof.

In an embodiment, first actuator sensor 151, FIG. 1 provides an actuator valve position signal that may include signal noise such that a brief exceedance of the actuator valve limit due to signal noise would cause unacceptably frequent false positive trips of actuator valve monitor 162. Accordingly, one or more signal filters may be employed to remove signal noise and one or more checks may be performed to determine if an actuator valve exceedance persists for an extended duration, the length of which may be adjusted in connection with the extent of exceedance, as described below.

In a step 501, an actuator command is provided. In an example of step 501, input command 102 includes a command for operating first actuator 131. In an embodiment, first actuator 131 includes an electro hydraulic servo valve (EHSV) that receives an electrical current for commanding the EHSV position. The electrical current may be commanded by input command 102 and provided via first controller 121, for example.

In a step 502, an actuator valve limit is provided. In an example of step 502, a predetermined limit for EHSV position is provided via software 255, FIG. 2.

In a step 510, a difference is determined to evaluate whether or not an exceedance has occurred. In an example of step 510, a difference between the actuator valve command of step 501 and the actuator valve limit of step 502 is determined to evaluate whether or not an exceedance has occurred. There are several ways to evaluate whether or not an exceedance has occurred. In certain embodiments, actuator valve position is evaluated as a binary state such that exceedance is determined to be any absolute value above a predetermined limit; or, actuator valve position is evaluated as a range such that exceedance is determined to be any value outside a predetermined range; or, actuator valve position is evaluated as a range with a correct sign such that exceedance is determined to be any value outside a predetermined range in a predetermined direction; or, actuator valve position is evaluated by dynamically tracking position within a predetermined tolerance. In an alternative embodiment, dynamic tracking of actuator valve position is compared to a model of actuator valve position (e.g., using a physics-based computational model of the actuator, similar to step 315, FIG. 3).

In an optional step 520, the exceedance is filtered with a time constant. Step 520 is an example of step 421, FIG. 4. Step 520 filters the exceedance from step 510 to remove transient spikes in the signal based on a predetermined time constant. In other words, signal spikes that are shorter in duration than the predetermined time constant are removed to provide a filtered exceedance signal.

In an optional step 532, a scaled factor is used to reduce the actuator valve limit. In an example of step 532, the predetermined limit for EHSV position is reduced by a predetermined scaled factor via software 255, FIG. 2.

In step 535, a threshold is determined from a combination of the actuator valve limit provided in step 502 and the scaled factor provided in step 532. In an example of step 535, the actuator valve limit is multiplied by the scaled factor to determine the threshold. If optional step 532 is not used (e.g., the scaled factor equals one), the threshold is equivalent to the actuator valve limit.

A step 540 is a decision. If in step 540, the exceedance from step 520 is greater than the threshold from step 535, method 500 proceeds to step 550. Otherwise, method 500 returns to step 501 to initiate a next cycle of method 500.

In an optional step 550, a controller/actuator switch is prepared. Step 550 is an example of step 451, FIG. 4 to prepare switch 105, FIG. 1 for switching from a first controller/actuator pair (e.g., first controller 121 and first actuator 131) to a second controller/actuator pair (e.g., second controller 122 and second actuator 132). The preparation provides a delay prior to switching to enable second controller/actuator pair adequate time to establish control over control surface 140 and ensure a smooth transition between controller/actuator pairs.

A step 560 is another decision. If in step 560, the exceedance persists for a predetermined duration, method 500 proceeds to step 570. Otherwise, method 500 returns to step 501 to initiate a next cycle of method 500.

In a step 570, the controller/actuator pair is switched. Step 570 is an example 470, in which switch 105 switches control of control surface 140 from first controller 121 and first actuator 131 to second controller 122 and second actuator 132.

In an optional step 575, the exceedance is flagged. Step 575 is an example of step 475 in which a flag is set in software 255 and may be reported, via interface 256 for example, that a known faulty condition exists.

Figure 6:
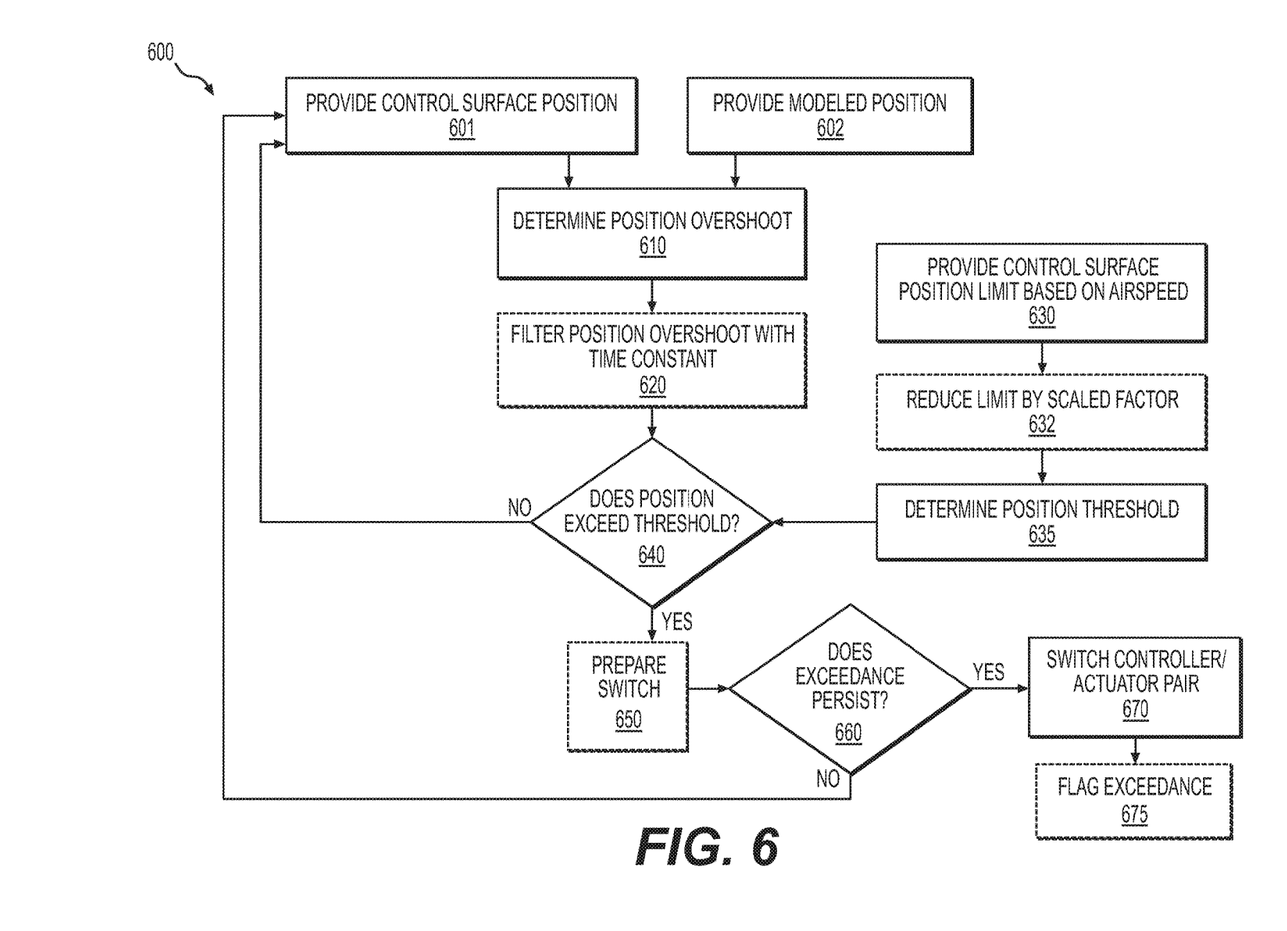
FIG. 6 shows steps of an overshoot monitoring method performed using the overshoot monitor instructions of FIGS. 1 and 2, in an embodiment.
Figure 7:
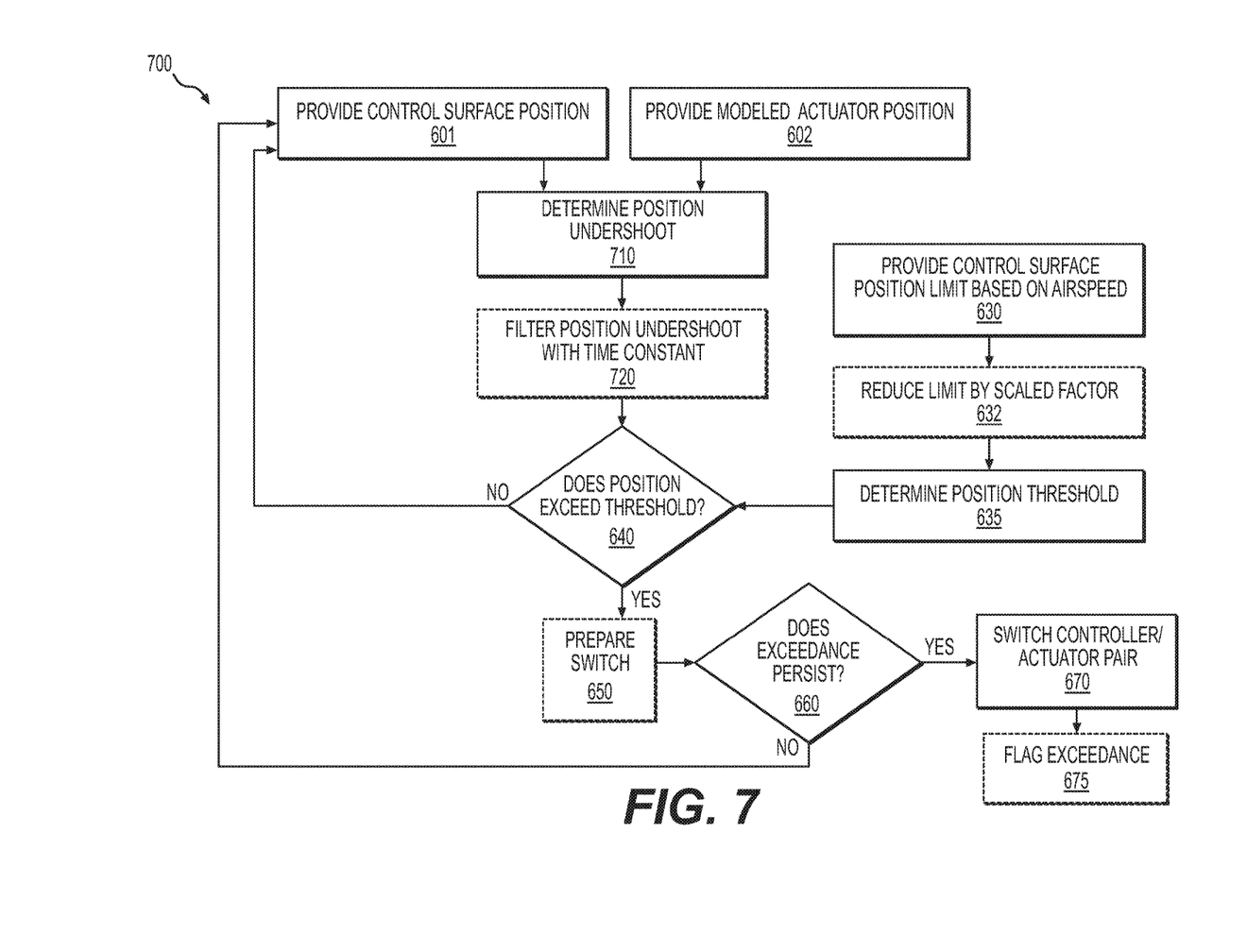
FIG. 7 shows steps of an undershoot monitoring method performed using the undershoot monitor instructions of FIGS. 1 and 2, in an embodiment.

FIG. 6 shows exemplary steps of an overshoot monitoring method 600 performed using for example flight computer 250, FIG. 2, executing instructions of overshoot monitor 163. In an embodiment, method 600 monitors position of control surface 140, FIG. 1 to determine an overshoot from an expected position to prevent control surface 140 from reaching an unsafe position. In certain embodiments, method 600 may be used to determine a rate of control surface position change instead of control surface position without departing from the scope hereof. In other embodiments, method 600 may be used to determine a direction of control surface motion instead of control surface position without departing from the scope hereof. FIGS. 6 and 7 include similarities and are best viewed together with the following description.

FIG. 7 shows exemplary steps of an undershoot monitoring method 700 performed using for example flight computer 250, FIG. 2, executing instructions of undershoot monitor 164. In an embodiment, method 700 monitors position of control surface 140 to determine an undershoot from an expected position to prevent control surface 140 from reaching an unsafe position. In certain embodiments, method 700 may be used to determine a rate of control surface position change instead of control surface position without departing from the scope hereof. In other embodiments, method 700 may be used to determine a direction of control surface motion instead of control surface position without departing from the scope hereof.

Returning to FIG. 6, in a step 601, a control surface position is provided. Step 601 is an example of step 401, FIG. 4 in which position of control surface 140, FIG. 1 is provided via control surface sensor 153.

In a step 602, a modeled position is provided. In an example of step 602, a position of first actuator 131, FIG. 1 is modeled and used to determine the position of control surface 140 based on input command 102 and command model 110 using flight computer 250, FIG. 2.

In a step 610, an uncommanded position is determined. In an example of step 610, an overshoot position is determined. In another example of step 610, an incorrect direction of motion is determined (e.g., a direction opposite of an intended direction). When an overshoot occurs, the actual position of control surface 140 is moving further away from a nominal position than intended. This may be due to a "hot" actuator that operates faster than anticipated, which may be caused by for example machining tolerances of an actuator valve. In an example of step 610, the absolute value of the difference between the control surface position provided in step 601 and the modeled position provided in step 602 is determined. The command signal of input command 102 may be removed from the sensor signal of control surface sensor 153 (e.g., by subtraction) such that any remaining signal is considered position overshoot.

In certain embodiments, subtraction of the command signal from the sensor signal to determine position overshoot or undershoot (see FIG. 7) depends on the sign of the command signal (e.g., the commanded direction of motion) and the sign of the current actuator valve position (e.g., the actual direction of motion).

In an optional step 620, the overshoot signal is filtered with a time constant to remove signal noise. Step 620 is an example of step 420, FIG. 4 in which transient signal spikes that are shorter in duration than a predetermined time constant are removed to provide a filtered overshoot signal.

In a step 630, a control surface limit is provided based on an aircraft parameter. In an example of step 630, a limit is provided for position of control surface 140 as a function of airspeed (provided by airspeed indicator 270), such that position deviation from nominal is more limited at higher airspeeds. At higher airspeeds, aerodynamic load on control surfaces increases, thus increasing the need to limit movement of the control surface. For example, while taxiing a rudder angle may be limited to thirty-three degrees from nominal, whereas during level-steady flight at cruising altitude the rudder angle may be limited to only two degrees from nominal. Alternatively, the actuator rate may be further reduced based on other aircraft parameters, including but not limited to estimated airspeed, stabilizer trim position, or flap position.

In an optional step 632, the control surface limit is further reduced by a scaled factor. In an example of step 632, position control surface 140 is reduced by a scaled factor or ratio of its full position range to provide a safe operating margin.

In a step 635, a position threshold is determined. In example of step 635, a position threshold for control surface 140 is determined based on the position limit provided in step 630 and optionally the scaled factor provided in step 632. In an embodiment, the position limit is multiplied by the scaled factor to determine the threshold. The position limit may be a predetermined value or a ratio as a function of airspeed, for example.

A step 640 is a decision. If in step 640 the position overshoot signal exceeds the position threshold, method 600 proceeds to step 650. Otherwise, method 600 returns to step 601 to initiate a next cycle of method 600. Step 640 may differ for overshoot versus undershoot conditions, which is important for differentiating differences that represent a risk to structure as opposed to differences that simply affect performance.

In an optional step 650, a controller/actuator switch is prepared. Step 650 is an example of step 451, FIG. 4 to prepare switch 105, FIG. 1 for switching from a first controller/actuator pair (e.g., first controller 121 and first actuator 131) to a second controller/actuator pair (e.g., second controller 122 and second actuator 132). The preparation provides a delay prior to switching to enable second controller/actuator pair adequate time to establish control over control surface 140 and ensure a smooth transition between controller/actuator pairs.

A step 660 is another decision. If in step 650 the position overshoot exceedance persists for a predetermined duration, method 600 proceeds to step 670. Otherwise, method 600 returns to step 601 to initiate a next cycle of method 600.

In certain embodiments, the modeled position may be reset to equal the actual position. This resets the command model 110 such that the difference between the modeled (i.e., expected) position and the actual position is zero. This allows switching to the backup controller/actuator in situations where a failed state caused by the primary controller/actuator would prematurely cause an exceedance of the monitor trip levels before the backup controller/actuator has enough time to physically recover from the failure and align the actual position with the expected position.

In a step 670, the controller/actuator pair is switched. Step 670 is an example of step 470, in which switch 105 switches control of control surface 140 from first controller 121 and first actuator 131 to second controller 122 and second actuator 132.

In an optional step 675, the exceedance is flagged. Step 675 is an example of step 475 in which a flag is set in software 255 and may be reported, via interface 256 for example, that a known faulty condition exists.

Returning to FIG. 7, many steps of method 700 are the same as steps of method 600 and are enumerated with like numerals. Accordingly, their description is not repeated here. Method 700 determines a position undershoot, which is similar to method 600 that determines a position overshoot.

In a step 710, a position undershoot is determined. Step 710 determines if the actual position of control surface 140 is moving further away from a nominal position slower than intended. This may be due to a "cold" actuator that operates slower than anticipated, which may be caused by for example machining tolerances of an actuator valve. In an example of step 710, the absolute value of the difference between the control surface position provided in step 601 and the modeled position provided in step 602 is determined. The sensor signal of control surface sensor 153 may be removed (e.g., subtracted) from the command signal of input command 102 such that any remaining signal is considered position undershoot. In certain embodiments, subtraction of the sensor signal from the command signal to determine position overshoot or undershoot depends on the sign of the command signal and the sign of the current actuator valve position.

In an optional step 720, the undershoot signal is filtered with a time constant to remove signal noise. Step 720 is an example of step 620, FIG. 6 in which transient signal spikes that are shorter in duration than a predetermined time constant are removed to provide a filtered undershoot signal.

Methods 600 and 700 determine whether an actual position of control surface 140 is overshooting or undershooting an intended position, respectively, to quickly determine potential unsafe operating positions and switch controller/actuator pairs to prevent catastrophic failure.

In certain embodiments, where the input command has an error (e.g., due to faulty low-airspeed information), the controller may cause the actuator to command more deflection at a given flight condition than intended. The actuator attempts to meet the commanded input, but is limited due to hinge-moment loads (e.g., at an airspeed that is higher than expected due to the faulty low-airspeed information). Method 700 detects the undershooting actuator (e.g., stalling) and switches to the second controller/actuator pair. However, due to the erroneous input command, the second actuator also undershoots. In this scenario, exceedance is flagged as in step 675 for both the first and second actuators. This double exceedance may serve as an independent means to indicate faulty air data (e.g., even if faulty air data is undetected by conventional means).

Figure 8:
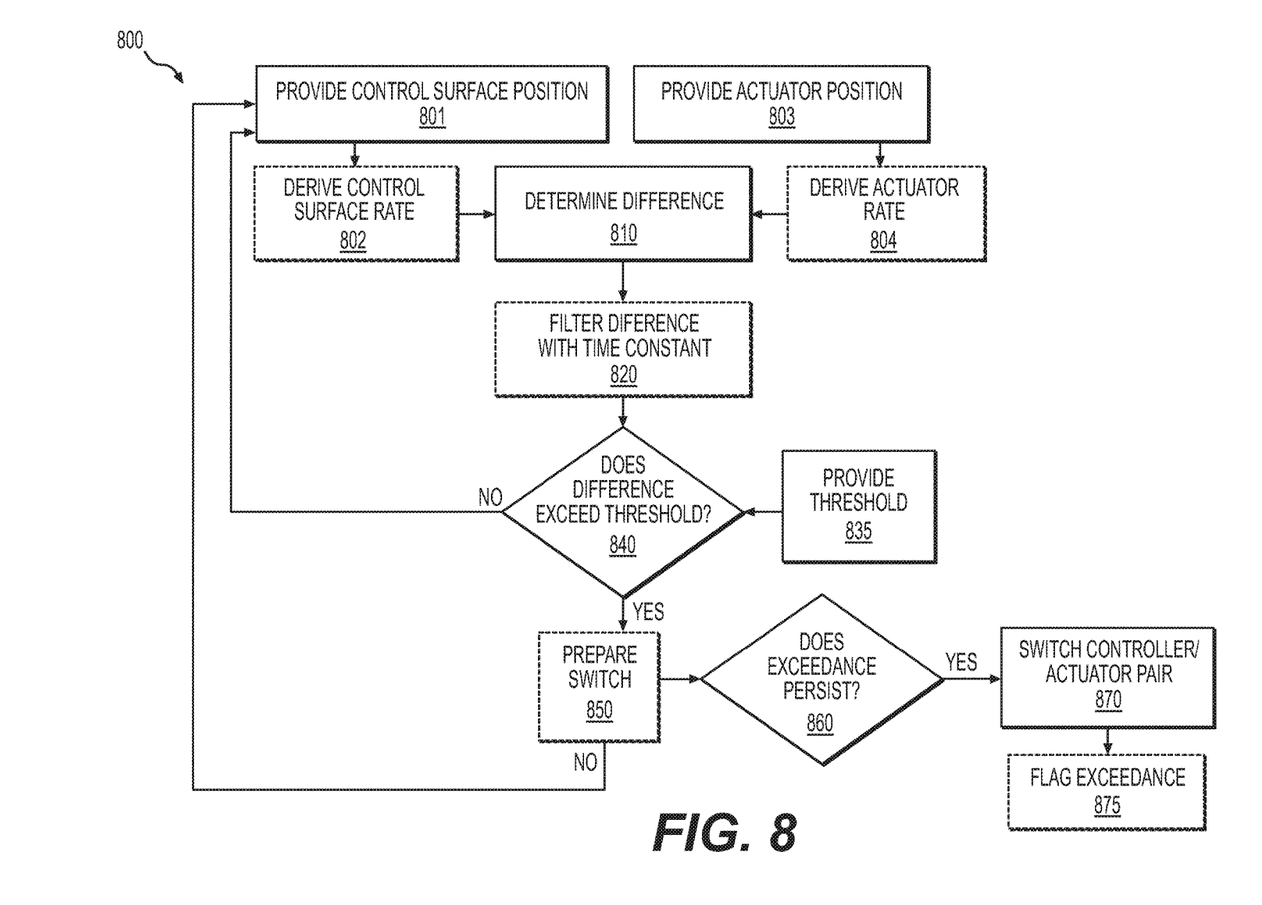
FIG. 8 shows steps of a disconnect monitoring method performed using the disconnect monitor instructions of FIGS. 1 and 2, in an embodiment.

FIG. 8 shows exemplary steps of a disconnect monitoring method 800 performed using for example flight computer 250, FIG. 2, executing instructions of disconnect monitor 165. In an embodiment, method 800 monitors position of first actuator 131 and position of control surface 140 to determine if an unexpected difference or disconnect exists and prevent control surface 140 from reaching an unsafe position. Alternatively, method 800 may be used to determine rates of position change instead of position without departing from the scope hereof.

In a step 801, a control surface position is provided. Step 801 is an example of step 401, FIG. 4. In an embodiment, control surface sensor 153 measures a hinge angle of control surface 140.

In an optional step 802, a control surface rate is derived. In an example of step 802, a rate of movement for control surface 140 is derived from position information provided by control surface sensor 153 over time.

In a step 803, an actuator position is provided. Step 803 is an example of step 303 FIG. 3. In an embodiment, first actuator sensor 151 measures a piston position of first actuator 131.

In an optional step 804, an actuator rate is derived. In an example of step 804, a rate of movement for first actuator 131 is derived from position information provided by first actuator sensor 151 over time.

In a step 810, a difference between control surface position and actuator position is determined based on positions from steps 801 and 803. In an example of step 810, the hinge angle of control surface 140 is compared to the piston position of first actuator 131 to determine if their respective positions correspond as expected or whether a disconnect has occurred. Optionally, a difference between control surface rate and actuator rate is also determined based on rate information from steps 802 and 804.

In an optional step 820, the difference signal is filtered with a time constant to remove signal noise. Step 820 is an example of step 420, FIG. 4 in which transient signal spikes that are shorter in duration than a predetermined time constant are removed to provide a filtered difference signal.

In a step 835, a difference threshold is provided. In an example of step 835, an acceptable difference between hinge angle of control surface 140 and piston position of first actuator 131 is determined. In another example of step 835, an acceptable difference between hinge angle rate of control surface 140 and piston rate of first actuator 131 is determined.

A step 840 is a decision. If in step 840 the difference signal exceeds the threshold, method 800 proceeds to step 850. Otherwise, method 800 returns to step 801 to initiate a next cycle of method 800.

In an optional step 850, a controller/actuator switch is prepared. Step 850 is an example of step 451, FIG. 4 to prepare switch 105, FIG. 1 for switching from a first controller/actuator pair (e.g., first controller 121 and first actuator 131) to a second controller/actuator pair (e.g., second controller 122 and second actuator 132). The preparation provides a delay prior to switching to enable second controller/actuator pair adequate time to establish control over control surface 140 and ensure a smooth transition between controller/actuator pairs.

A step 860 is another decision. If in step 860 the difference exceedance persists for a predetermined duration, method 800 proceeds to step 870. Otherwise, method 800 returns to step 801 to initiate a next cycle of method 600.

In a step 870, the controller/actuator pair is switched. Step 870 is an example 470, in which switch 105 switches control of control surface 140 from first controller 121 and first actuator 131 to second controller 122 and second actuator 132.

In an optional step 875, the exceedance is flagged. Step 875 is an example of step 475 in which a flag is set in software 255 and may be reported, via interface 256 for example, that a known faulty condition exists.

Embodiments of the present disclosure include systems and methods to determine when a hardover event of a control surface is occurring and steps to mitigate the error. Advantages include dissimilar systems and methods that provide redundancy for improving performance as well as increasing safety.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

The invention claimed is:

1. An actuator hardover monitor for a control surface, comprising:
   an actuator sensor for detecting an actuator position of a first control-surface actuator configured to control the control surface;
   a computer having a processor for executing software instructions stored in non-transitory memory, the software instructions comprising:
      a command model of an expected position of the control-surface actuator based on an input command;
      a command delay for delaying the input command by a time lag to synchronize the command model with a deflection of the control surface; and
      a monitor to determine whether a difference between the actuator position and the expected position exceeds a threshold for a predetermined duration; and a switch for switching to a second control-surface actuator configured to control the control surface when the difference exceeds the threshold for at least the predetermined duration.

2. The actuator hardover monitor of claim 1, further comprising a controller to adjust the actuator position of the first control-surface actuator to reduce the difference between the actuator position and the expected position.

3. The actuator hardover monitor of claim 1, wherein the threshold comprises a softstop limit corresponding to a deflection range based on an aircraft parameter that is within a physical capability of the control surface.

4. The actuator hardover monitor of claim 1, further comprising a control surface sensor for detecting a control-surface position such that the monitor determines whether a difference between the control-surface position and the expected position exceeds the threshold for the predetermined duration.

5. The actuator hardover monitor of claim 1, wherein the monitor determines whether a difference between the control-surface position and the actuator position exceeds the threshold for the predetermined duration.

6. A method of mitigating unintended deflection of a control surface, comprising:
providing, from a sensor, a position signal indicative of a position of the control surface;
providing a softstop limit corresponding to a deflection range of the control surface based on an aircraft parameter;
determining when the position signal exceeds the softstop limit;
monitoring the position signal for a first duration; and
switching from a primary control-surface actuator to a backup control-surface actuator for driving the control surface, when the position signal persists for at least the first duration.

7. The method of claim 6, further comprising, prior to the step of switching, preparing a switch by delaying the switching step to enable the backup control-surface actuator time to establish control over the control surface for providing a smooth transition from the primary control-surface actuator to the backup control-surface actuator.

8. The method of claim 6, further comprising filtering the position signal based on a first time constant to provide a first filtered position signal.

9. The method of claim 8, further comprising:
filtering the position signal based on a second time constant, different than the first time constant, to provide a second filtered position signal;
monitoring the second filtered position signal for a second duration, different than the first duration; and
switching from the primary control-surface actuator to the backup control-surface actuator when the first filtered position signal persists for at least the first duration and the second filtered position signal persists for at least the second duration.

10. A method of anticipating and mitigating unintended deflections of a control surface, comprising:
commanding an actuator valve to a commanded position, wherein the actuator valve is configured to control the control surface;
determining continuously when the commanded position exceeds an actuator valve limit to provide an exceedance; and
switching to a backup control-surface actuator when the exceedance exceeds the actuator valve limit for a predetermined duration.

11. The method of claim 10, further comprising filtering the exceedance based on a time constant to provide a filtered exceedance.

12. The method of claim 10, further comprising modeling the actuator valve position based on a physics-based computational model of the actuator valve and the commanded position.

13. The method of claim 10, wherein the step of determining comprises evaluating the commanded position as a binary state such that the exceedance is determined to be any absolute value above the actuator valve limit.

14. The method of claim 10, wherein the step of determining comprises evaluating the commanded position as a range such that the exceedance is determined to be any value outside a predetermined range.

15. The method of claim 10, wherein the step of determining comprises evaluating the commanded position as a range with a correct sign such that exceedance is determined to be any value outside the predetermined range in a predetermined direction.

16. The method of claim 10, wherein the step of determining comprises evaluating the commanded position by dynamically tracking the actuator valve position within a predetermined tolerance using a sensor.

17. The method of claim 10, further comprising modifying the actuator valve limit by a scaled factor to determine a threshold, and determining continuously when the commanded position exceeds the threshold to provide the exceedance.

18. A method of correcting uncommanded motion of a control surface of an aircraft, comprising:
providing an actual position of the control surface from a position sensor;
modeling an expected position of the control surface based on a control input;
determining a difference between the actual position and the expected position;
providing a limit for the control surface position based on an aircraft parameter;
determining whether the difference exceeds the limit for a predetermined duration; and
switching to a backup control surface actuator when the difference exceeds the limit for at least the predetermined duration.

19. The method of claim 18, further comprising filtering a signal of the difference based on a time constant.

20. The method of claim 18, wherein the difference is due to an incorrect direction of motion.

21. The method of claim 18, wherein the difference is an overshoot of the actual position above the expected position.

22. The method of claim 18, wherein the difference is an undershoot of the actual position below the expected position.

23. The method of claim 18, wherein the aircraft parameter is from the group consisting of airspeed, estimated airspeed, stabilizer trim position, and flap position.

24. The method of claim 18, further comprising resetting the expected position to equal the actual position such that the difference is zero prior to the step of switching to a backup control surface actuator.

25. A method of mitigating unintended deflection of a control surface, comprising:
providing a measured position of the control surface based on a control-surface sensor;
deriving a control surface rate based on the measured position of the control surface;

providing an expected position of the control surface based on a position of an actuator valve from an actuator-valve sensor, wherein the actuator valve is configured to control the control surface;

deriving an actuator rate based on the position of the actuator valve;

determining a difference between the control surface rate and the expected position actuator rate;

determining whether the difference exceeds a predetermined threshold for a predetermined duration; and switching to a backup actuator valve when the difference is greater than the predetermined threshold for at least the predetermined duration.

26. The method of claim 25, further comprising filtering a signal of the difference based on a time constant to provide a filtered signal difference.

* * * * *